(12) United States Patent
George et al.

(10) Patent No.: US 8,028,072 B2
(45) Date of Patent: Sep. 27, 2011

(54) METHOD, APPARATUS AND COMPUTER PROGRAM PRODUCT IMPLEMENTING SESSION-SPECIFIC URLS AND RESOURCES

(75) Inventors: David A. George, Somers, NY (US);
Raymond B. Jennings, III, Ossining, NY (US); Suresh N. Chari, Scarsdale, NY (US); Anees Shaikh, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 316 days.

(21) Appl. No.: 12/041,146

(22) Filed: Mar. 3, 2008

(65) Prior Publication Data
US 2009/0222561 A1    Sep. 3, 2009

(51) Int. Cl.
*G06F 15/16* (2006.01)
(52) U.S. Cl. ................................... 709/227
(58) Field of Classification Search .............. 709/227
See application file for complete search history.

(56) References Cited

U.S. PATENT DOCUMENTS

| | | | | |
|---|---|---|---|---|
| 5,978,373 A * | 11/1999 | Hoff et al. | | 370/392 |
| 6,701,317 B1 * | 3/2004 | Wiener et al. | | 707/10 |
| 7,042,879 B2 * | 5/2006 | Eschbach et al. | | 370/392 |
| 2003/0046407 A1 * | 3/2003 | Erickson et al. | | 709/229 |
| 2003/0086390 A1 * | 5/2003 | Eschbach et al. | | 370/329 |
| 2003/0088676 A1 * | 5/2003 | Smith et al. | | 709/227 |
| 2003/0088765 A1 * | 5/2003 | Eschbach et al. | | 713/150 |
| 2003/0236995 A1 * | 12/2003 | Fretwell, Jr. | | 713/200 |
| 2004/0064730 A1 * | 4/2004 | Kamiyama et al. | | 713/201 |
| 2005/0254422 A1 * | 11/2005 | Harkin et al. | | 370/230 |
| 2005/0283534 A1 * | 12/2005 | Bigagli et al. | | 709/229 |
| 2005/0283614 A1 * | 12/2005 | Hardt | | 713/182 |
| 2007/0094665 A1 * | 4/2007 | Jackson | | 718/104 |
| 2007/0118839 A1 * | 5/2007 | Berstis et al. | | 718/105 |
| 2009/0154686 A1 * | 6/2009 | Purdy et al. | | 379/265.09 |
| 2009/0193513 A1 * | 7/2009 | Agarwal et al. | | 726/15 |
| 2009/0282404 A1 * | 11/2009 | Khandekar et al. | | 718/1 |

(Continued)

FOREIGN PATENT DOCUMENTS

WO    WO 03-090104 A1    10/2003

(Continued)

OTHER PUBLICATIONS

Lawenda, Marcin et al. Running Interactive Jobs in the Grid Environment. 2005/2006. SPringer-Verlag Berlin Heidelberg. pp. 1-8.*

(Continued)

*Primary Examiner* — John Follansbee
*Assistant Examiner* — Imad Hussain
(74) *Attorney, Agent, or Firm* — Harrington & Smith

(57) ABSTRACT

Methods, apparatus and computer program products implement session-specific URIs for allocating network resources by receiving a request from a user for at least one network resource; assigning a session-specific URI to the at least one network resource for use in identifying the at least one network resource and controlling access to the at least one network resource; updating a network directory service with the session-specific URI; and communicating the session-specific URI to the user. The user communicates the session-specific URI to other participants in the session during which the at least one network resource will be used. After a predetermined time, the session ends and the at least one network resource is de-allocated by, for example, changing the URI of the at least one network resource. Frequent changes of URIs hinder efforts by unauthorized individuals to gain access to network resources.

20 Claims, 3 Drawing Sheets

FOREIGN PATENT DOCUMENTS

WO   WO 2005-104553 A1   11/2005

OTHER PUBLICATIONS

Elmroth, Erik et al. An Interoperable, Standards-based Grid Resource Broker and Job Submission Service. 2005. IEEE. pp. 1-9.*

M. Mealling, et al., "Report from the Joint W3C/IETF URI Planning Interest Group: Uniform Resource Identifiers (URIs), URLs, and Uniform Resource Names (URNs) Clarifications and Recommendations", Aug. 2002, pp. 1-11.

* cited by examiner

METHOD, APPARATUS AND COMPUTER PROGRAM PRODUCT IMPLEMENTING SESSION-SPECIFIC URLS AND RESOURCES

TECHNICAL FIELD

The invention generally concerns network resource allocation and more specifically concerns methods, apparatus and computer program products for allocating network resources in a manner that facilitates access to the network resources by authorized parties and hinders access to the network resources by unauthorized parties.

BACKGROUND

As all manner of computer resources become networked to support collaborative work activities by parties that may be geographically distant from one another, network administrators are confronted with numerous and increasing security issues. "Hackers" and "hacking" have reached such levels that the terms are now well-known to the general public. "Hackers" are individuals who "hack into" networks to gain unauthorized access to networked computer resources. Those engaged in hacking have varied objectives—some seek access to confidential information for use in criminal activities while others are modern-day anarchists who seek to disrupt the activities of others merely for "the thrill of it". In any case, hacking, if left unchallenged, can seriously interfere with networked-based collaborations.

A conventional response to network security is to issue passwords that control access to networked resources. There are well-known problems with passwords. Passwords may be implemented in such a simple-minded manner that it makes it easy for hackers to break the password using computer programs. Instances where individuals have used easily-guessed terms for passwords have significantly facilitated the hacking activities of unauthorized individuals. In addition, substantial resources must be dedicated to assigning, managing and changing passwords. Other more complex access control methods like biometrics similarly have significant resource and management requirements.

Thus, those skilled in the art seek methods, apparatus and computer program products that enhance network security while reducing resource and management requirements. In particular, those skilled in the art seek methods, apparatus and computer program products that capitalize on aspects of collaboration that may be used to simplify access control. For instance, collaborations may involve a limited group of individuals for a short period of time. Methods, apparatus and computer program products that implement network security based on these features of typical collaborations are of particular interest to those skilled in the art.

SUMMARY OF THE INVENTION

The foregoing and other problems are overcome, and other advantages are realized, in accordance with the following embodiments of the invention.

A first embodiment of the invention is an electronic device comprising: a network interface configured to receive requests for at least one network resource; and a resource allocator coupled to the network interface, the resource allocator configured to receive a request from a user for at least one network resource through the network interface; to assign session-specific information to the at least one network resource for use in identifying the at least one network resource and controlling access to the at least one network resource; to update a network directory service with the session-specific information; and to communicate the session-specific information to the user.

A second embodiment of the invention is a computer program product comprising a computer readable memory medium tangibly embodying a computer program, the computer program configured to operate a network resource allocator, wherein when the computer program is executed the network resource allocator is configured to receive a request from a user for at least one network resource; to assign session-specific information to the at least one network resource for use in identifying the at least one network resource and controlling access to the at least one network resource; to update a network directory service with the session-specific information; and to communicate the session-specific information to the user.

A third embodiment of the invention is a method comprising: receiving a request from a user for at least one network resource; assigning session-specific information to the at least one network resource for use in indentifying the at least one network resource and controlling access to the at least one network resource; updating a network directory service with the session-specific information; and communicating the session-specific information to the user.

A fourth embodiment of the invention comprises an apparatus that implements session-specific URIs for allocating network resources by receiving a request from a user for at least one network resource; assigning a session-specific URI to the at least one network resource for use in identifying the at least one network resource and controlling access to the at least one network resource; updating a network directory service with the session-specific URI; and communicating the session-specific URI to the user.

In conclusion, the foregoing summary of the embodiments of the invention is exemplary and non-limiting. For example, one of ordinary skill in the art will understand that one or more aspects or steps from one embodiment can be combined with one or more aspects or steps from another embodiment to create a new embodiment within the scope of the present invention. Further, one skilled in the art will appreciate that steps of a method embodiment can be implemented as functions in an apparatus embodiment, and vice versa.

BRIEF DESCRIPTION OF THE DRAWINGS

The foregoing and other aspects of these teachings are made more evident in the following Detailed Description of the Invention, when read in conjunction with the attached Drawing Figures, wherein.

DETAILED DESCRIPTION OF THE INVENTION

Figure 1:
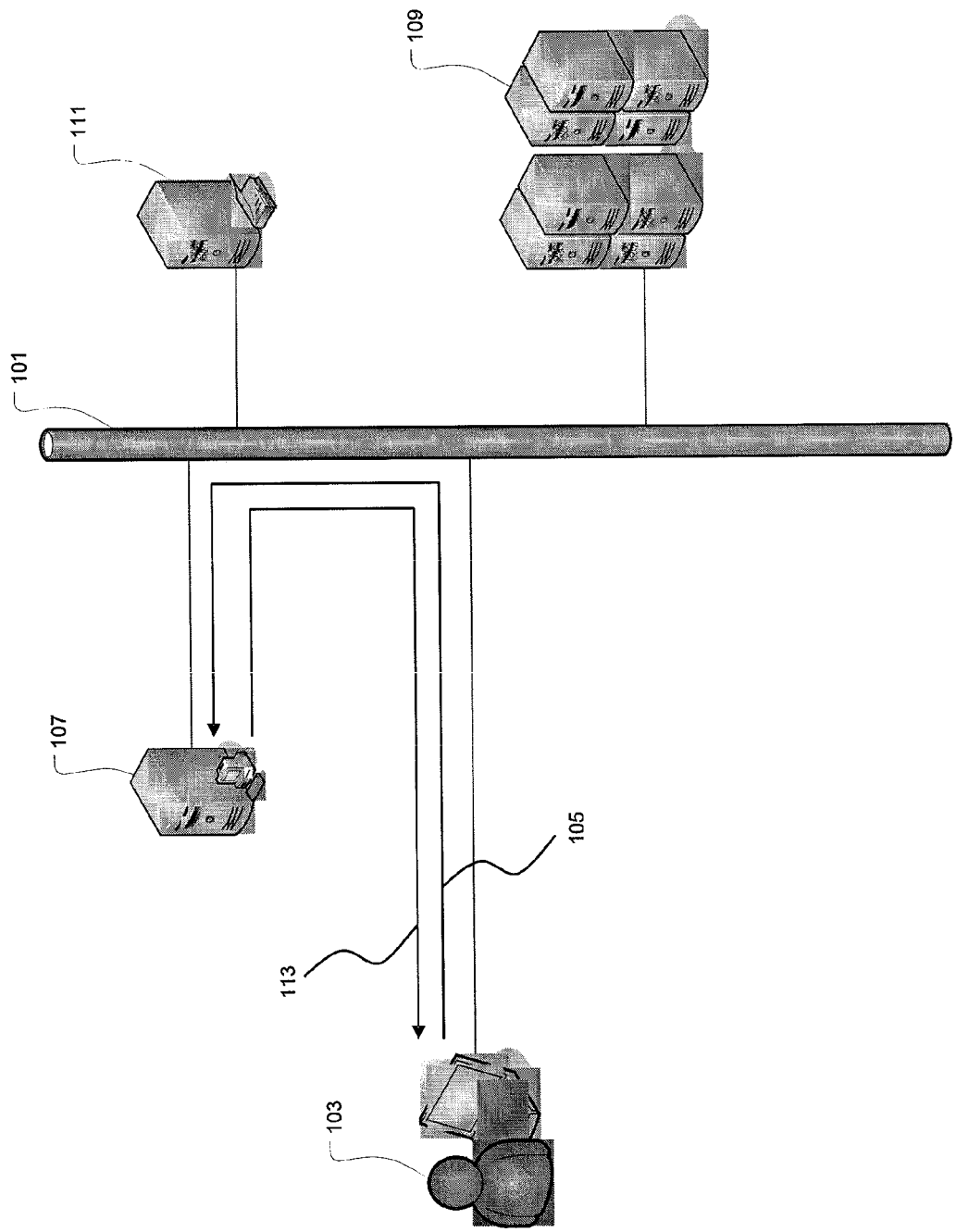
FIG. 1 shows a diagram of a network system for requesting a dynamically allocated and globally unique URI in accordance with the invention.

Embodiments of the invention allocate network resources on an as-needed basis by generating information for use in identifying network resources and for controlling access to network resources when a request for network resources is made. When a user submits a request for a network resource—e.g. a server—for use in a collaborative activity or demonstration, a network resource allocator operating in accordance with the invention receives the request and selects a network resource—a particular server—that will accommodate the request. The network resource allocator assigns identification information to the selected network resource that identifies the selected network resource and controls access to the selected network resource. The identification information controls access to the selected network resource because the identification information will be distributed only to those individuals that will participate in the collaborative activity or demonstration. Those who are not authorized to participate—eg. external hackers—will not be able to hijack or interfere with the resource because they do not have the identification information and unlikely will be able to "hack" the identification information because the collaborations or demonstrations will typically be short-term activities. In one aspect, the network resource identification information comprises a URI specifying a network address where the network resource can be found. Typical embodiments of the invention operate on a session-specific basis when, for example, a collaboration session or demonstration session requiring network resources is initiated by a user. Methods, apparatus and computer program products implementing embodiments of the invention dynamically establish globally unique URIs for identifying the network resource during the pendency of the collaboration or demonstration. Once the collaboration or demonstration is over, the network resource allocator de-allocates the network resource by changing the session-specific URI.

In one embodiment, the present invention is a system and a service for hidden URIs and network resources. Embodiments of the present invention enable a user to request, establish and utilize a network-based server for the purpose of collaboration with a set of specific users that are aware of the hidden URIs that will lead to the network site. Once the collaboration period has completed the network site can be removed and the URIs unallocated and not used again until some significant time has expired.

Another embodiment of the present invention comprises a system for the establishment of globally unique and obfuscated URIs for identifying short-term network resources for user collaboration such as websites, team rooms and multi-user network conferences. The purpose of the obfuscated URIs is to help prevent denial of service attacks and general hacking. The obfuscation is performed by taking a distinct random name for part of the URI, including the domain name, hostname, port number, directory, page or filename with the URI. The scheme can work with any protocol including HTTP and ftp. By the time a potential hacker would be able to identify and locate a resource it will already have served its purpose and have been unallocated and will no longer be in use.

An example URI would be of the form: http://kldjle00133.yihwjneo0.net/kieoldkekd/uoeru8047238.jsp.

For long term private websites and team rooms a more stringent authentication process would normally be used with access lists and authentication means.

By having a site with obfuscated URIs it provides for a simple means to prevent unauthorized users. The contents of the dynamically created site may not be strictly confidential but just of a private nature where access by the general public may is to be avoided. This method allows for easy access to the site for those who have been given the secret URI information typically within an email message. Using this method, access lists with usernames and passwords are not required.

FIG. 1 shows a system in accordance with an embodiment of the invention. In FIG. 1, general network 101 can consist of any number of network segments and underlying network hardware. For clarity a single network segment 101 is shown. Those skilled in the art can appreciate that each of the physical items within FIG. 1 can be located on different physical networks and there only need be a way to connect the various pieces.

A user 103 makes a request 105 to a network resource allocator/manager 107. The allocator/manager 107 in an embodiment of the invention comprises a server having a processing unit, memory, and a program stored in memory. When the program is executed by the processing unit, the allocator/manager performs the methods of the invention. The request 105 consists of a message requesting that one or more network resources be allocated on a network. The attributes of a request 105 in exemplary embodiments comprise a time period for usage; bandwidth requirements; and application requirements. The network resource allocator 107 allocates one or more network resources shown as 109. The step of allocating includes making active for use one or more URIs on one or more servers that can be reached by users over a network, where the network can be either a private or public network. In some cases a single server 109 could be used to fulfill multiple requests 105 made by other users 103.

The resource allocator 107 updates any directory services 111 such as a DNS server so that any users of the newly created resource can locate the resources on the network 101. One or more responses 113 are sent back to the requestor 103 indicating the attributes of the newly created network resource including hostname, main URIs, time that resources will be made available and for how long.

A further aspect of the invention allows for a user 103 to upload an application to an allocated network resource where the URIs within the application are obfuscated. This process can be in addition to or instead of the process described earlier. It may be that a main network server name is used and well known to all users but the main starting point URIs are hidden and obfuscated. In this example a well known hostname like www.site.com is known to all users but to get access to a particular page or application any user would need to know the hidden URI such as http://www.site.com/kiek48dkeidjf. The process of hiding and obfuscating URIs can occur on the allocated network resource 109, on the network allocator 107 or as a stand alone process that the requestor 103 uses locally.

The probability of URI name collisions among different requesters 103 is very small and can be verified by using a central allocator 107 to warn of duplicate or recently used URIs.

Figure 2:
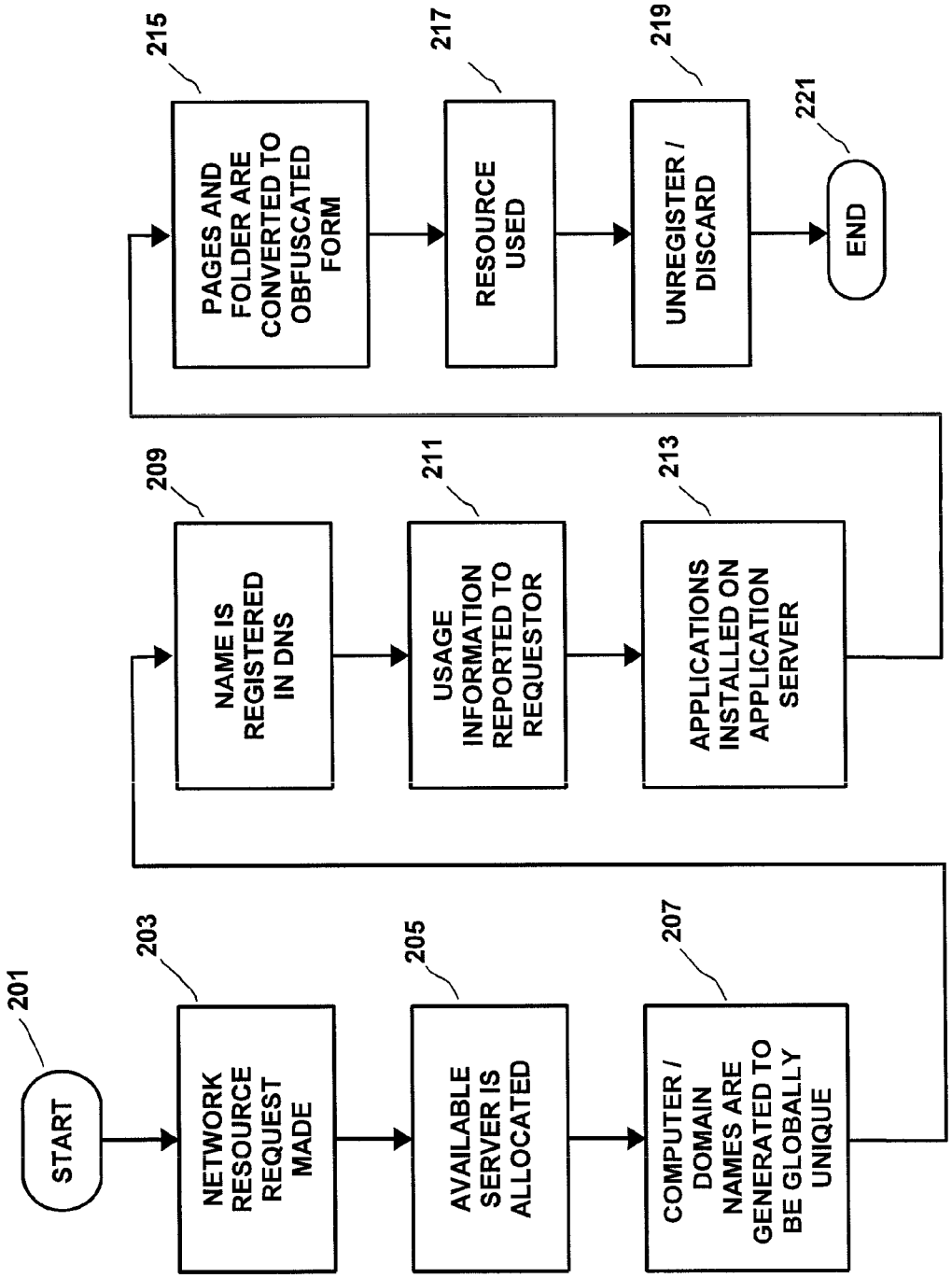
FIG. 2 is a flow chart depicting a method operating in accordance with the invention.

FIG. 2 shows a flow chart depicting a method in accordance with the invention. The method starts at 201. A request 105 is made by a requester 103 in step 203. An available server is allocated by the resource allocator 107 in step 205. A unique and obfuscated URI is created in step 207. The hostname is registered with the service locator 111 in step 209. Usage information 113 is then communicated to the requester 103 in step 211. Any applications are uploaded to the allocated server 109 in 207 in step 213 where the pages, folder names and files are converted to the obfuscated replacement names at step 215. The network resources 109 are used for some period of time in 217. At step 219 the hostname is unregistered with the service locator 111 and any URIs are discarded. The process ends at step 221.

Figure 3:
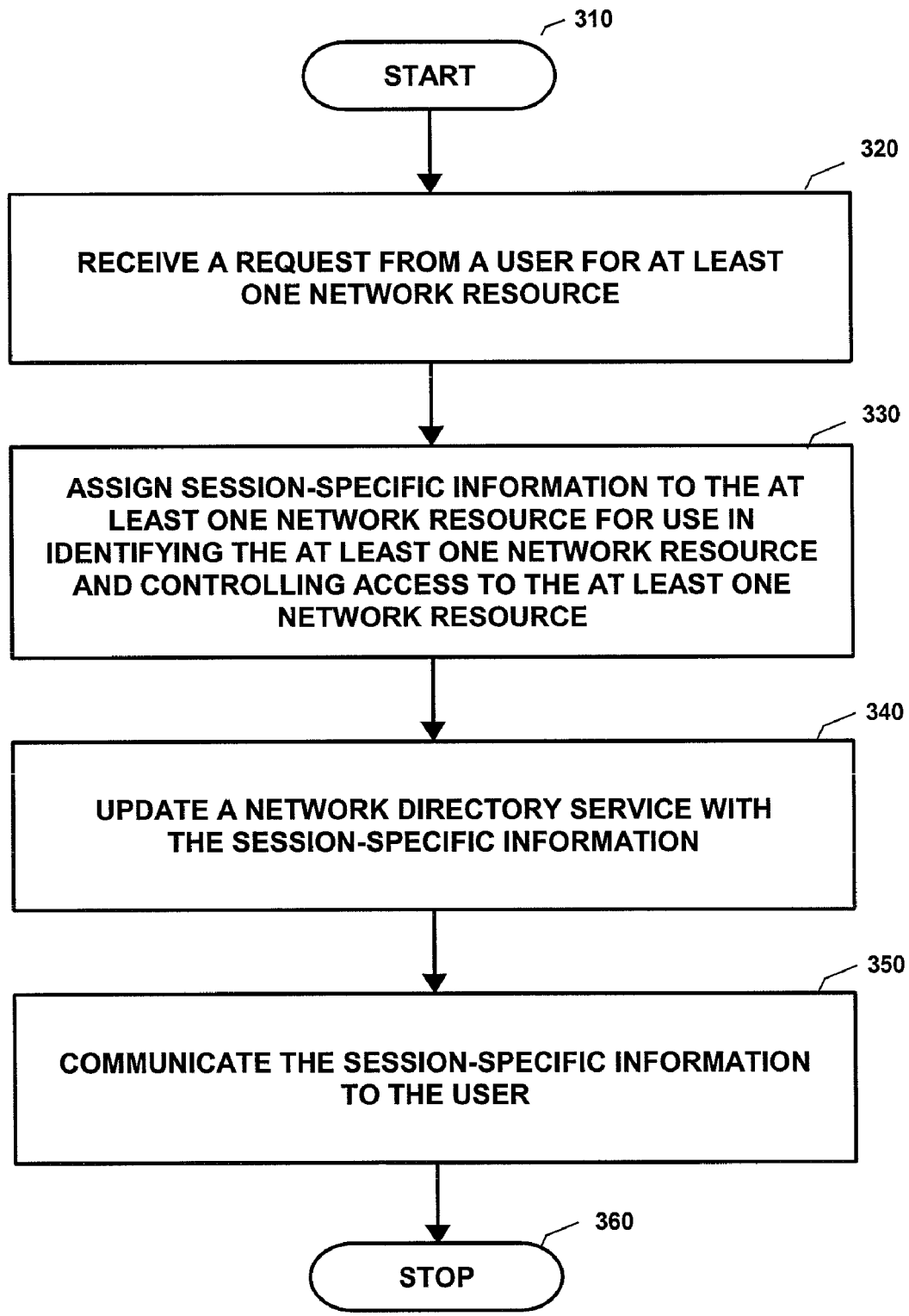
FIG. 3 is a flow chart depicting another method operating in accordance with the invention.

FIG. 3 depicts a method that may be implemented in a computer program embodied in a computer program product, or a network resource allocator, both configured in accordance with embodiments of the invention. The method starts at 310. Next, at 320, a network resource allocator configured in accordance with the invention receives a request from a user for at least one network resource. Then, at 330, the network resource allocator assigns session-specific information to the at least one network resource for use in identifying the at least one network resource and controlling access to the at least one network resource. Next, at 340, the network resource allocator updates a network directory service with the session-specific information. Then, at 350, the network resource allocator communicates the session-specific information to the user. The method stops at 360.

The system and method of the present disclosure is implemented and executed by a general-purpose computer or computer system. The computer system may be any type known, contemplated or that will become known and typically comprises a processor, memory device, a storage device, input/output devices, internal buses, and/or a communications interface for communicating with other computer systems in conjunction with communication hardware and software, etc.

The terms "computer system" and "computer network" as used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the invention may include and may be included within fixed and portable devices such as desktops, laptops, and servers.

The embodiments described above are illustrative examples and it should not be construed that the present invention is limited to these particular embodiments. Thus, various changes and modifications may be effected by one skilled in the art without departing from the spirit or scope of the invention as defined in the appended claims.

Thus it is seen that the foregoing description has provided by way of exemplary and non-limiting examples a full and informative description of the best apparatus and methods presently contemplated by the inventors for implementing session-specific URIs. One skilled in the art will appreciate that the various embodiments described herein can be practiced individually; in combination with one or more other embodiments described herein; or in combination with methods and apparatus differing from those described herein. Further, one skilled in the art will appreciate that the present invention can be practiced by other than the described embodiments; that these described embodiments are presented for the purposes of illustration and not of limitation; and that the present invention is therefore limited only by the claims which follow.

We claim:

1. An electronic device comprising:
a processor coupled with a memory device configured to implement:
a network interface configured to receive requests for at least one network resource for use by a plurality of users during a collaborative activity; and
a resource allocator coupled to the network interface, the resource allocator configured:
to receive a request from a user for at least one network resource through the network interface;
to assign session-specific information to the at least one network resource for use in identifying the at least one network resource and controlling access to the at least one network resource;
where the session-specific information comprises a uniform resource identifier identifying a session-specific network address of the at least one network resource,
where the uniform resource identifier comprises an obfuscated name intended to hinder attempts to gain unauthorized access to the at least one network resource,
to update a network directory service with the session-specific information;
to communicate the session-specific information to the user;
to receive an upload from the user of at least one application for use by the at least one network resource during the collaborative activity, and
to obfuscate names of components that comprise a part of the at least one uploaded application.

2. The electronic device of claim 1 where uniform resource identifiers within the uploaded application are obfuscated.

3. The electronic device of claim 1 wherein the uniform resource identifier is a globally unique uniform resource identifier.

4. The electronic device of claim 1 wherein the uniform resource where the components comprise at least one of pages, folder names and files.

5. The electronic device of claim 1 where the request for the at least one network resource specifies a time period during which the user seeks to use the at least one network resource, and wherein the resource allocator is further configured to change the session-specific information after the time period has elapsed.

6. The electronic device of claim 1 where the request for the at least one network resource specifies a bandwidth requirement.

7. The electronic device of claim 1 where the request for the at least one network resource specifies at least one network requirement.

8. The electronic device of claim 1 where the resource allocator is further configured to communicate to the user information comprising when the at least one network resource will be made available.

9. The electronic device of claim 1 where the resource allocator is further configured to communicate to the user information comprising for how long the at least one network resource will be made available.

10. The electronic device of claim 1 where the at least one application is available for a period of time when the user will have access to the at least one network resource.

11. The electronic device of claim 1, where the at least one network resource is resident on a publicly-accessible network component, and wherein assignment of session-specific information hinders users who otherwise have access to the network component from gaining unauthorized access to the at least one network resource.

12. A non-transitory computer readable memory medium tangibly embodying a computer program, the computer program configured to operate a network resource allocator, wherein when the computer program is executed the network resource allocator is configured to receive a request from a user for at least one network resource for use by a plurality of users during a collaborative activity; to assign session-specific information to the at least one network resource for use in identifying the at least one network resource and controlling access to the at least one network resource; where the session-specific information comprises a uniform resource identifier identifying a session-specific network address of the at least one network resource, where the uniform resource identifier comprises an obfuscated name intended to hinder attempts to gain unauthorized access to the at least one network resource, to update a network directory service with the session-specific information; to communicate the session-specific information to the user; to receive an upload from the user of at least one application for use by the at least one network resource during the collaborative activity, and to obfuscate names of components that comprise a part of the at least one uploaded application.

13. The computer readable memory medium of claim 12 where uniform resource identifiers within the uploaded application are obfuscated.

14. The computer readable memory medium of claim 12 wherein the uniform resource identifier is a globally unique uniform resource identifier.

15. The computer readable memory medium of claim 12 where the components comprise at least one of pages, folder names and files.

16. A method comprising:
   receiving a request from a user for at least one network resource for use by a plurality of users during a collaborative activity;
   assigning session-specific information to the at least one network resource for use in identifying the at least one network resource and controlling access to the at least one network resource, where the session-specific information comprises a uniform resource identifier identifying a session-specific network address of the at least one network resource, where the uniform resource identifier comprises an obfuscated name intended to hinder attempts to gain unauthorized access to the at least one network resource;
   updating a network directory service with the session-specific information;
   communicating the session-specific information to the user;
   receiving an upload from the user of at least one application for use by the at least one network resource during the collaborative activity; and
   obfuscating names of components that comprise a part of the at least one uploaded application.

17. The method of claim 16 where uniform resource identifiers within the uploaded application are obfuscated.

18. The method of claim 16 wherein the uniform resource identifier is a globally unique URI.

19. The method of claim 16 where the components comprise at least one of pages, folder names and files.

20. The method of claim 16 where the request for the at least one network resource specifies a time period during which the user seeks to use the at least one network resource, and wherein the method further comprises changing the session-specific information after the time period has elapsed.

* * * * *